(12) United States Patent
Wen

(10) Patent No.: US 6,171,679 B1
(45) Date of Patent: Jan. 9, 2001

(54) BREATHABLE AND COMPRESSIBLE LAMINATED CLOTH

(76) Inventor: Jeff Wen, No. 5-2, Shui-Ching Lane, Ping Ho Village, She Tou Hsian, Chang Hua Hsien (TW)

(*) Notice: Under 35 U.S.C. 154(b), the term of this patent shall be extended for 0 days.

(21) Appl. No.: 09/052,952

(22) Filed: Apr. 1, 1998

(51) Int. Cl.[7] .......................... B29C 67/14; D03D 11/00; D04D 1/00
(52) U.S. Cl. .......................... 428/112; 428/100; 428/98; 428/192; 428/193; 442/246
(58) Field of Search .............. 442/246; 428/192, 428/193, 98, 100, 112, 85, 88, 93, 94, 96

(56) References Cited

U.S. PATENT DOCUMENTS 5,413,837 * 5/1995 Rock et al. .......................... 428/192

FOREIGN PATENT DOCUMENTS

WO 94/01272 * 1/1994 (WO).

* cited by examiner

*Primary Examiner*—Richard Weisberger
(74) *Attorney, Agent, or Firm*—Browdy and Neimark

(57) ABSTRACT

A laminated cloth is composed of a first cloth sheet and a second cloth sheet. The first cloth sheet has a knitcloth layer and a hairy layer of fiber and extending from one side of the knitcloth layer. The second cloth sheet is adhered to the hairy layer which is breathable and compressible.

9 Claims, 1 Drawing Sheet

BREATHABLE AND COMPRESSIBLE LAMINATED CLOTH

FIELD OF THE INVENTION

The present invention relates generally to a laminated cloth, and more particularly to a laminated cloth that is breathable and compressible.

BACKGROUND OF THE INVENTION

The compressible laminated cloth of the prior art is composed of a thin sheet of knitcloth and a thin sheet of a foam elastic material, which are pressed together. The foam elastic material is generally foam cotton, ethylene vinyl acetate (EVA), or neoprene. Such a prior art compressible laminated cloth as described above is used in making shoes, exercise devices, bags, etc. The foam cotton has an aging problem, whereas EVA and neoprene have a breathing problem.

There is another prior art laminated cloth, which is composed of two thin sheets of knitcloth and a fiber support layer sandwiched between the two parallel knitcloth sheets. This laminated cloth is soft and breathable; nevertheless its compressibility is poor in light of the limited number and length of the fiber in the fiber support layer. In addition, this laminated cloth is expensive.

SUMMARY OF THE INVENTION

The primary objective of the present invention is to provide a breathable and compressible laminated cloth which can be made at a low cost and is free from the problems of aging and hydrolysis.

In keeping with the principle of the present invention, the foregoing objective of the present invention is attained by the breathable and compressible laminated cloth consisting of a first cloth sheet and a second cloth sheet. The first cloth sheet has a knitcloth layer and a hairy layer extending from one side of the knitcloth layer. The second cloth sheet is adhered to the hairy layer which is both breathable and compressible.

DETAILED DESCRIPTION OF THE INVENTION

Figure 1:
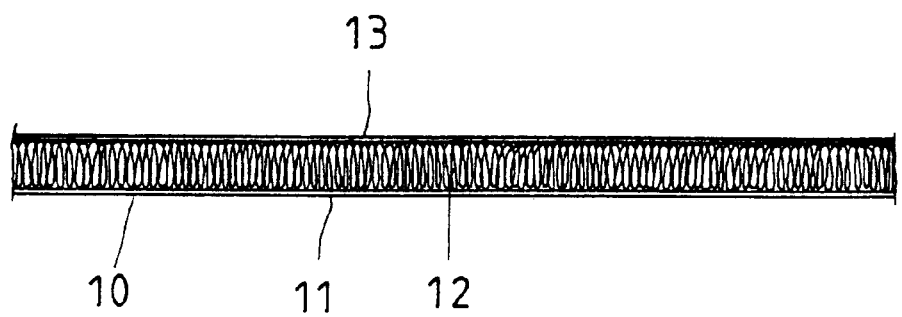
FIG. 1 shows a schematic view of a first preferred embodiment of the present invention.

As shown in FIG. 1, a laminated cloth of the first preferred embodiment of the present invention is composed of a first cloth sheet 10 and a second cloth sheet 13.

The first cloth sheet 10 has a knitcloth layer 11 and a hairy layer 12 formed of densely-distributed fibers and extending from one side of the knitcloth layer 11. The fibers are helically arranged.

The second cloth sheet 13 is attached to the hairy layer 12 by adhesive such that the hairy layer 12 is sandwiched between the first cloth sheet 10 and the second cloth sheet 13. The hairy layer 12 is breathable and compressible.

Figure 2:
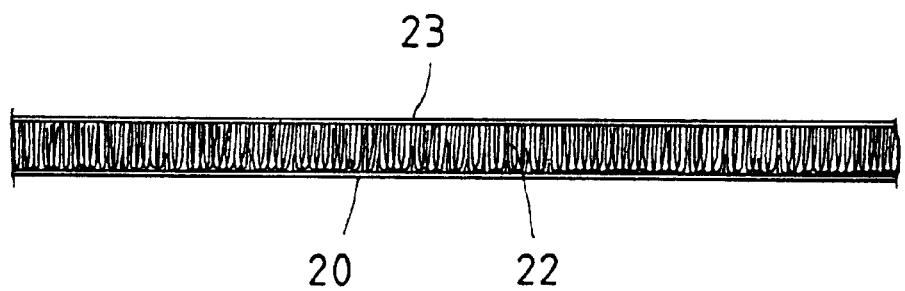
FIG. 2 shows a schematic view of a second preferred embodiment of the present invention.

As shown in FIG. 2, a laminated cloth of the second preferred embodiment of the present invention is composed of a first cloth sheet 20, a second cloth sheet 23, and a hairy layer 22 sandwiched between the first cloth sheet 20 and the second cloth sheet 23. The fibers of the hairy layer 22 are perpendicular to the first cloth sheet 20 and the second cloth sheet 23.

Figure 3:
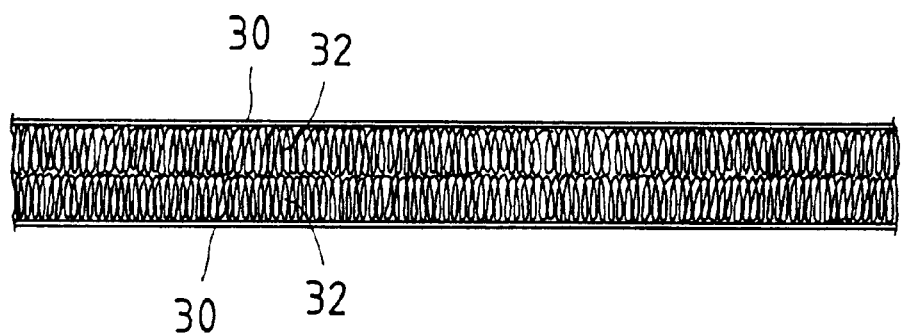
FIG. 3 shows a schematic view of a third preferred embodiment of the present invention.

As shown in FIG. 3, a laminated cloth of the third preferred embodiment of the present invention is composed of two cloth sheets 30 each having a hairy layer 32 which is sandwiched between the two cloth sheets 30 such that the two hairy layers 32 are arranged face-to-face. It must be noted here that the present invention may be composed of two or more hairy layers 32.

The hairy layer of the laminated cloth of the present invention is resilient and compressible. When the laminated cloth of the present invention is exerted on by an external force, the fibers of the hairy layer are slanted. Upon the relief of the external force, the fibers of the hairy layer are once again erect. The fibers of the hairy layer are resistant to hydrolysis and aging.

The hairy layer of the present invention is breathable and does not obstruct the air circulation.

The laminated cloth of the present invention is provided with a good feel of touch and is soft and resilient.

The laminated cloth of the present invention can be made to become more compressible by increasing the number of the hairy layers.

The laminated cloth of the present invention is cost-effective in design in that the hairy layer is attached to the cloth sheets by adhesive, and that the laminated cloth can be made in quantity and with speed.

The laminated cloth of the present invention can be made from polyethylene terephthalate (PET) by wire drawing process. PET can be recycled from the discarded beverage containers made of PET. As a result, the present invention has an incidental benefit of protecting the environment in which we live.

What is claimed is:

1. A breathable and compressible laminated cloth consisting of:
    a first cloth sheet;
    a hairy layer formed of densely-distributed fibers extending from and attached to one face of said first cloth sheet, said hairy layer being formed of fibers which are helically arranged or extend vertically from said first cloth sheet; and
    a second cloth sheet attached by adhesive to said hairy layer such that said hairy layer is sandwiched between said first cloth sheet and said second cloth sheet.

2. The laminated cloth as defined in claim 1, wherein said hairy layer is adhesively connected to said first cloth sheet and second cloth sheet.

3. The laminated cloth as defined in claim 1, wherein said hairy layer is integral with said first cloth sheet.

4. The laminated cloth according to claim 1, wherein said first cloth sheet is a knit sheet.

5. The laminated cloth as defined in claim 1, wherein said bears o said hairy layer are helically arranged.

6. The laminated cloth as defined in claim 1, wherein said fibers of said hairy layer are arranged vertically in relation to said first cloth sheet and said second cloth sheet.

7. A breath able and compressible laminated cloth comprising two cloth sheets each having a hairy layer which is sandwiched between said two cloth sheets such that the hairy layers of said two cloth sheets are adhered face-to-face.

8. A breathable and compressible laminated cloth comprising two cloth layers having at least one compressible hairy layer sandwiched therebetween, said hairy layer being formed of helically arranged fibers.

9. The laminated cloth as defined in claim 8, wherein said helically arranged fibers of said hairy layer are integral with at least one of said cloth layers.

* * * * *